United States Patent
Ingber et al.

(10) Patent No.: US 8,428,152 B2
(45) Date of Patent: Apr. 23, 2013

(54) DEVICE, METHOD AND SYSTEM OF UPLINK COMMUNICATION BETWEEN WIRELESS VIDEO MODULES

(75) Inventors: Amir Ingber, Petah Tikva (IL); Lior Ophir, Herzlia (IL); Eli Shusterman, Kfar Saba (IL)

(73) Assignee: Amimon Ltd., Herzlia (IL)

( * ) Notice: Subject to any disclaimer, the term of this patent is extended or adjusted under 35 U.S.C. 154(b) by 1333 days.

(21) Appl. No.: 11/957,458

(22) Filed: Dec. 16, 2007

(65) Prior Publication Data

US 2008/0144726 A1  Jun. 19, 2008

Related U.S. Application Data

(60) Provisional application No. 60/870,312, filed on Dec. 15, 2006.

(51) Int. Cl.
*H04N 7/12* (2006.01)
*H04N 11/02* (2006.01)
*H04N 11/04* (2006.01)

(52) U.S. Cl.
USPC .................................................. 375/240.28

(58) Field of Classification Search ............... 375/240.28
See application file for complete search history.

(56) References Cited

U.S. PATENT DOCUMENTS

| 5,428,647 | A | * | 6/1995 | Rasky et al. | 375/366 |
| 5,818,825 | A | * | 10/1998 | Corrigan et al. | 370/329 |
| 2003/0002582 | A1 | | 1/2003 | Obrador | |
| 2003/0194016 | A1 | * | 10/2003 | Gorecki et al. | 375/268 |
| 2004/0196920 | A1 | | 10/2004 | Loheit et al. | |
| 2005/0030932 | A1 | * | 2/2005 | Kelly et al. | 370/345 |
| 2006/0209745 | A1 | | 9/2006 | MacMullan et al. | |
| 2006/0209890 | A1 | | 9/2006 | MacMullan et al. | |
| 2006/0209892 | A1 | * | 9/2006 | MacMullan et al. | 370/468 |
| 2006/0212911 | A1 | | 9/2006 | MacMullan et al. | |
| 2007/0098063 | A1 | | 5/2007 | Reznic et al. | |
| 2007/0171304 | A1 | | 7/2007 | Reznic et al. | |
| 2008/0086749 | A1 | | 4/2008 | Goldberg et al. | |

FOREIGN PATENT DOCUMENTS

| WO | 2005/029737 | 3/2005 |
| WO | 2006/101801 | 9/2006 |
| WO | 2006/118964 | 11/2006 |

* cited by examiner

*Primary Examiner* — Mark Rinehart
*Assistant Examiner* — Maharishi Khirodhar
(74) *Attorney, Agent, or Firm* — Eitan, Mehulal & Sadot (57) ABSTRACT

Some demonstrative embodiments include devices, systems and/or methods of wireless video communication. Some embodiments include an apparatus including a downlink receiver to receive a wireless downlink video transmission from a video source module, and an uplink transmitter to transmit to the wireless video source module a wireless uplink transmission. Other embodiments are described and claimed.

29 Claims, 6 Drawing Sheets

DEVICE, METHOD AND SYSTEM OF UPLINK COMMUNICATION BETWEEN WIRELESS VIDEO MODULES

CROSS-REFERENCE

This application claims priority from and the benefit of U.S. Provisional Patent application 60/870,312, entitled "Uplink modem for transmitting control information from a video display unit to a video source unit", filed Dec. 15, 2006, the entire disclosure of which is incorporated herein by reference.

FIELD

Some embodiments relate generally to the filed of wireless communication and, more particularly, to wireless communication including video information.

BACKGROUND

Wireless communication has rapidly evolved over the past decades. Even today, when high performance and high bandwidth wireless communication equipment is made available there is demand for even higher performance at a higher data rates, which may be required by more demanding applications.

Video signals may be generated by various video sources, for example, a computer, a game console, a Video Cassette Recorder (VCR), a Digital-Versatile-Disc (DVD), or any other suitable video source. In many houses, for example, video signals are received through cable or satellite links at a Set-Top Box (STB) located at a fixed point.

In many cases, it may be desired to place a display, screen or projector at a location in a distance of at least a few meters from the video source. This trend is becoming more common as flat-screen displays, e.g., plasma or Liquid Crystal Display (LCD) televisions are hung on a wall, Connection of such a display or projector to the video source through cables is generally undesired for aesthetic reasons and/or installation convenience. Thus, wireless transmission of the video signals from the video source to the screen is preferred.

SUMMARY

Some demonstrative embodiments include systems and/or methods of wireless video communication.

In some demonstrative embodiments, an apparatus may include a downlink receiver to receive a wireless downlink video transmission from a video source module; and an uplink transmitter to transmit to the wireless video source module a wireless uplink initialization frame to initialize a connection to the video source module, wherein the uplink initialization frame includes one or more synchronization sequences followed by one or more data sequences, wherein each of the synchronization sequences includes two or more consecutive repetitions of a predefined synchronization symbol, and/or wherein each of the data sequences includes two or more consecutive repetitions of a data symbol.

In some demonstrative embodiments, the one or more synchronization sequences include a first synchronization sequence followed by a second synchronization sequence, the first synchronization sequence includes at least two repetitions of a first synchronization symbol, and the second synchronization sequence includes at least two repetitions of a second synchronization symbol.

In some demonstrative embodiments, the one or more synchronization sequences include a third synchronization sequence following the second synchronization sequence and including at least two repetitions of the first synchronization symbol.

In some demonstrative embodiments, the first and second synchronization symbols include first and second sets of frequency bins, respectively, and the data symbol includes frequency bins of both of the first and second sets.

In some demonstrative embodiments, the first set of frequency bins is logically exclusive to the second set of frequency bins.

In some demonstrative embodiments, at least one of the data and synchronization symbols includes a plurality of bits, wherein each of the bits is mapped to at least two frequency bins.

In some demonstrative embodiments, each of the bits is mapped to at least four frequency bins.

In some demonstrative embodiments, one or more of the synchronization sequences includes three repetitions of a synchronization symbol, and one or more of the data sequences includes three repetitions of a data symbols.

In some demonstrative embodiments, the uplink transmitter is to transmit to the wireless video source module a wireless uplink data frame over the uplink connection.

In some demonstrative embodiments, the uplink data frame includes a plurality of Discrete-Fourier-transform data symbols.

In some demonstrative embodiments, the uplink transmitter is to synchronize between the uplink data frame and the downlink transmissions.

In some demonstrative embodiments, the uplink transmitter is to synchronize between the uplink data frame and the downlink transmission based on a frequency offset corresponding to a frame of the downlink transmission.

In some demonstrative embodiments, at least one of the data symbols of the data frame includes a plurality of bits, wherein each of the bits is mapped to at least two frequency bins.

In some demonstrative embodiments, one or more of the synchronization and data symbols may include an orthogonal-frequency-division-multiplexing symbol.

In some demonstrative embodiments, one or more of the synchronization and data symbols may include a discrete-Fourier-transform.

In some demonstrative embodiments, one or more of the synchronization and data symbols may include an on-off-keying symbol, an M-ary Phase Shift Keying symbol, or an M-Order Quadrature Amplitude Modulation symbol.

In some demonstrative embodiments, the apparatus may include a display to display a video image corresponding to the downlink video transmission.

In some demonstrative embodiments a method of wireless video communication may include receiving a wireless downlink video transmission from a video source module; and transmitting to the wireless video source module a wireless uplink initialization frame to initialize a connection to the video source module, wherein the uplink initialization frame includes one or more synchronization sequences followed by one or more data sequences, wherein each of the synchronization sequences includes two or more consecutive repetitions of a predefined synchronization symbol, and/or wherein each of the data sequences includes two or more consecutive repetitions of a data symbol.

In some demonstrative embodiments, the one or more synchronization sequences include a first synchronization sequence followed by a second synchronization sequence, the first synchronization sequence includes at least two repetitions of a first synchronization symbol, and the second synchronization sequence includes at least two repetitions of a second synchronization symbol.

In some demonstrative embodiments, the first and second synchronization symbols include first and second sets of frequency bins, respectively, and the data symbol includes frequency bins of both of the first and second sets.

In some demonstrative embodiments, at least one of the data and synchronization symbols includes a plurality of bits, wherein each of the bits is mapped to at least two frequency bins.

In some demonstrative embodiments, the method may include transmitting to the wireless video source module a wireless uplink data frame over the uplink connection.

In some demonstrative embodiments, the method may include synchronizing between the uplink data frame and the downlink transmission.

In some demonstrative embodiments, a system may include a video source to transmit a wireless downlink video transmission. The system may also include a video destination including a downlink receiver to receive the wireless downlink video transmission; and an uplink transmitter to transmit to the video source a wireless uplink initialization frame to initialize an uplink connection to the video source, wherein the unlink initialization frame includes one or more synchronization sequences followed by one or more data sequences, wherein each of the synchronization sequences includes two or more consecutive repetitions of a predefined synchronization symbol, and/or wherein each of the data sequences includes two or more consecutive repetitions of a data symbol. In some demonstrative embodiments, the video source may include a downlink transmitter to transmit the downlink transmission, and an uplink receiver to detect the initialization frame.

In some demonstrative embodiments an apparatus may include a downlink receiver to receive a wireless downlink video transmission from a video source module; and an uplink transmitter to transmit to the wireless video source module a wireless uplink data frame, wherein the uplink transmitter is to synchronize between the uplink data frame and the downlink transmission.

In some demonstrative embodiments, the uplink transmitter is to synchronize between the uplink data frame and the downlink transmission based on a frequency offset corresponding to a frame of the downlink transmission.

In some demonstrative embodiments, at least one data symbol of the data frame includes a plurality of bits, wherein each of the bits is mapped to at least two frequency bins.

In some demonstrative embodiments, the uplink data frame includes a plurality of Discrete-Fourier-transform data symbols.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. Moreover, some of the blocks depicted in the drawings may be combined into a single function. The figures are listed below.

DETAILED DESCRIPTION

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Unless specifically stated otherwise, as apparent from the following discussions, it is appreciated that throughout the specification discussions utilizing terms such as "processing," "computing," "calculating," "determining", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices. In addition, the term "plurality" may be used throughout the specification to describe two or more components, devices, elements, parameters and the likes.

It should be understood that some embodiments may be used in a variety of applications. Although embodiments of the invention are not limited in this respect, one or more of the methods, devices and/or systems disclosed herein may be used in many applications, e.g., civil applications, military applications or any other suitable application. In some demonstrative embodiments the methods, devices and/or systems disclosed herein may be used in the field of consumer electronics, for example, as part of any suitable television, video Accessories, Digital-Versatile-Disc (DVD), multimedia projectors, Audio and/or Video (A/V) receivers/transmitters, gaming consoles, video cameras, video recorders, and/or automobile A/V accessories. In some demonstrative embodiments the methods, devices and/or systems disclosed herein may be used in the field of Personal Computers (PC), for example, as part of any suitable desktop PC, notebook PC, monitor, and/or PC accessories. In some demonstrative embodiments the methods, devices and/or systems disclosed herein may be used in the field of professional A/V, for example, as part of any suitable camera, video camera, and/or A/V accessories. In some demonstrative embodiments the methods, devices and/or systems disclosed herein may be used in the medical field, for example, as part of any suitable endoscopy device and/or system, medical video monitor, and/or medical accessories. In some demonstrative embodiments the methods, devices and/or systems disclosed herein may be used in the field of security and/or surveillance, for example, as part of any suitable security camera, and/or surveillance equipment. In some demonstrative embodiments the methods, devices and/or systems disclosed herein may be used in the fields of military, defense, digital signage, commercial displays, retail accessories, and/or any other suitable field or application.

Although embodiments of the invention are not limited in this respect, one or more of the methods, devices and/or systems disclosed herein may be used to wirelessly transmit video signals, for example, High-Definition-Television (HDTV) signals, between at least one video source and at least one video destination. In other embodiments, the methods, devices and/or systems disclosed herein may be used to transmit, in addition to or instead of the video signals, any other suitable signals, for example, any suitable multimedia signals, e.g., audio signals, between any suitable multimedia source and/or destination.

Although some demonstrative embodiments are described herein with relation to wireless communication including video information, embodiments of the invention are not limited in this respect and some embodiments may be implemented to perform wireless communication of any other suitable information, for example, multimedia information, e.g., audio information, in addition to or instead of the video information. Some embodiments may include, for example, a method, device and/or system of performing wireless communication of A/V information, e.g., including audio and/or video information. Accordingly, one or more of the devices, systems and/or methods described herein with relation to video information may be adapted to perform wireless communication of A/V information.

Figure 1:
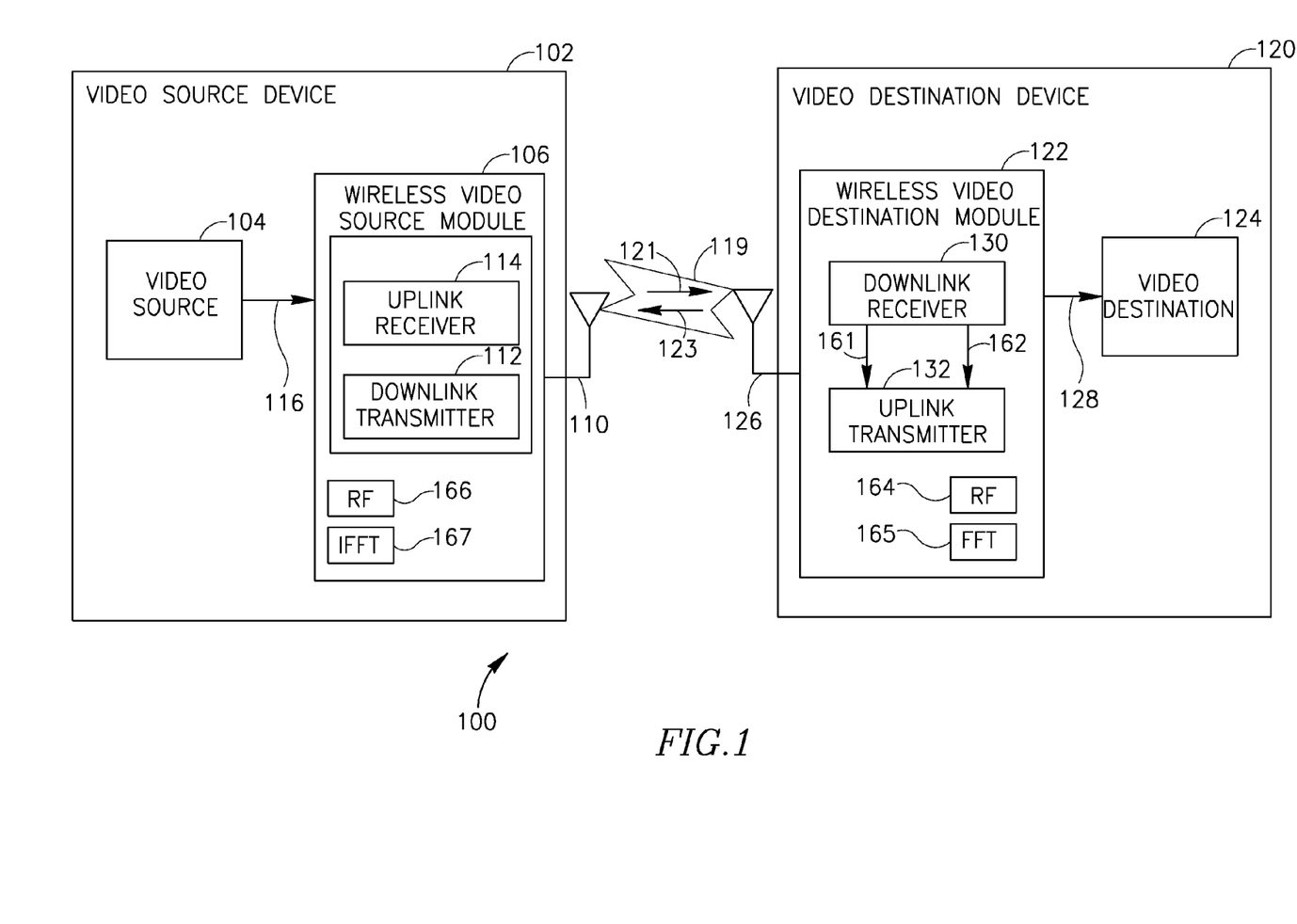
FIG. 1 is a schematic illustration of a video system in accordance with some demonstrative embodiments.

Reference is made to FIG. 1, which schematically illustrates a video system 100, in accordance with some demonstrative embodiments.

In some demonstrative embodiments, system 100 may include a video source 102 to generate video data 116, e.g., as described below. System 100 may also include a wireless video source module 106, and a wireless video destination module 122 to communicate with wireless video source module 106 via a wireless communication connection 119, e.g., as described below.

In some demonstrative embodiments, wireless video source module 106 may transmit to wireless video destination module 122 a wireless downlink video transmission 121 corresponding to video data 116. For example, wireless video source module 106 may include a downlink transmitter 112 to transmit downlink video transmission 121 via at least one antenna 110, e.g., as described below.

In some demonstrative embodiments, wireless video destination module 122 may include a downlink receiver 130 to receive wireless downlink video transmission 121, for example, via at least one antenna 126; and to generate video data 128 based on downlink transmission 121, e.g., as described below.

In some demonstrative embodiments, system 100 may also include a video destination 124 to handle video data 128. In some non-limiting example, video destination 124 may include a display to display a video image based on video data 128.

In some demonstrative embodiments, wireless video destination module 122 may also include an uplink transmitter 132 to transmit to wireless video source module 106 a wireless uplink transmission 123, for example, via at least one antenna 126. For example, wireless video source module 106 may include an uplink receiver 114 to receive uplink transmission 123, e.g., as described in detail below.

In some demonstrative embodiments, wireless uplink transmission 123 may be utilized to communicate any suitable information from wireless video destination module 122 to wireless video source module 106. In one example, wireless uplink transmission 123 may be utilized to transfer any suitable control, operation, and/or maintenance messages from wireless video destination module 122 to wireless video source module 106. The control messages may include, for example, control signals to control one or more downlink transmission parameters of downlink transmitter 112. In one example, a control message may include a request to downlink transmitter 112 to increase or decrease a transmission power of downlink transmission 121, to switch between transmission channel bands of downlink transmission 121, e.g., in the presence of an interference signal, and the like. The operation messages may include, for example, any suitable configuration information relating to video destination 124, video source 104, data 116, and/or data 128. In one example, an operation message may include a high-bandwidth digital content protection (HDCP) key exchange policy message, an encryption key, and the like.

In some demonstrative embodiments, uplink transmitter 132 may transmit uplink transmission 123 during a Vertical Blanking (VB) period corresponding to video signals 116, e.g., as described in U.S. patent application Ser. No. 11/619,810, entitled "Method and apparatus for using the video blanking period for the maintenance of a modem that is used for wireless transmission of a video", filed Jan. 4, 2007 ("the '810 application"), the entire disclosure of which is incorporated herein by reference. For example, signals 116 may include no video data during the VB period, which may correspond to a time period required for trace hack of an electron beam of a Cathode-Ray Tube (CRT). In other embodiments, uplink transmitter 132 may transmit uplink transmission 123 during any other suitable time period.

In some demonstrative embodiments, uplink transmission 123 may include a message represented by a plurality of symbols, for example, in accordance with an Orthogonal-Division-Frequency-Multiplexing (OFDM) modulation scheme, e.g., as described below.

In some demonstrative embodiments, uplink transmitter 132 may operate at an initialization mode of operation, and a data mode of operation, as described below.

In some demonstrative embodiments, during the initialization mode, uplink transmitter 132 may initialize a connection with uplink receiver 114. For example, uplink transmitter 132 may transmit uplink transmission 123 including identification (ID) information of uplink transmitter 132 and uplink receiver 114. In some demonstrative embodiments, the connection may be initialized without performing substantially any timing and/or frequency synchronization between uplink transmitter 132 and uplink receiver 114, e.g., as described below.

In some demonstrative embodiments, wireless uplink transmission 123 may include an uplink initialization frame to initialize the connection to source module 106, for example, during the initialization mode of operation, e.g., as described below.

In some demonstrative embodiments, the uplink initialization frame may include one or more synchronization sequences followed by one or more data sequences. One or more of the synchronization sequences may include, for example, two or more consecutive repetitions of a predefined synchronization symbol; and one or more of the data sequences may include two or more consecutive repetitions of at least one data symbol, e.g., as described below with reference to FIG. 2. In one example, the uplink initialization frame may include a plurality of Discrete-Fourier-Transform (DFT) data symbols, for example, Fast-Fourier-Transform (FFT) data symbols, e.g., as described below.

In some demonstrative embodiments, the at least one data symbol may include any suitable initialization data to initialize the connection. For example, the initialization data may include any suitable identification information identifying wireless video destination module 122 and/or wireless video source module 106; and/or information corresponding to one or more parameters of video destination 124, e.g., as described herein.

In some demonstrative embodiments, wireless uplink transmission 123 may include at least one wireless uplink data frame transmitted over the uplink connection, for example, during the data mode of operation, e.g., as described below with reference to FIG. 3. For example, the uplink data frame may include a plurality of DFT data symbols, for example, FFT data symbols, e.g., as described below.

In some demonstrative embodiments, uplink transmitter 132 may synchronize between the uplink data frame and a video frame of downlink video transmission 121, for example, based on at least one timing synchronization signal 161 and/or frequency offset signal 162 from downlink receiver 130, e.g., as described below.

In some demonstrative embodiments, wireless video source module 106 may include an uplink receiver 114 to receive uplink transmission 123, for example, via at least one antenna 110, e.g., as described below with reference to FIG. 5.

In some demonstrative embodiments, downlink transmitter 112 may implement any suitable transmission method and/or configuration to transmit downlink transmission 121. Although embodiments of the invention are not limited in this respect, in some demonstrative embodiments, downlink transmitter 112 may generate downlink transmission 121 according to the OFDM modulation scheme. According to other embodiments, downlink transmitter 112 may generate downlink transmission 121 according to any other suitable modulation and/or transmission scheme. In some demonstrative embodiments, downlink transmission 121 may include a Multiple-Input-Multiple-Output (MIMO) transmission. For example, transmitter 112 may modulate data of transmission 121 according to a suitable MIMO modulation scheme; and at least one antenna 110 may include a plurality of antennas.

In some non-limiting demonstrative embodiments, downlink transmitter 112 may generate downlink transmission 121 including at least one coarse constellation symbol representing a first component of a data value video data 116, and at least one fine constellation symbol representing a second component of the data value, for example, by applying a de-correlating transformation, e.g., a Discrete-Cosine-Transformation (DCT), to video data 116, e.g., as described in U.S. patent application Ser. No. 11/551,641, entitled "Apparatus and method for uncompressed, wireless transmission of video", filed Oct. 20, 2006, and published May 3, 2007, as US Patent Application Publication US 2007-0098063 ("the '641 application"), the entire disclosure of which is incorporated herein by reference.

In some demonstrative embodiments, downlink receiver 130 may be implemented by the wireless-video receiver described in the '641 application. In some demonstrative embodiments, downlink receiver 130 may implement any suitable reception method and/or configuration to receive downlink transmission 121. Although embodiments of the invention are not limited in this respect, in some demonstrative embodiments, downlink receiver 130 may receive and/or demodulate downlink transmission 121 according to an OFDM modulation scheme. According to other embodiments, downlink receiver 130 may receive and/or demodulate downlink transmission 121 according to any other suitable modulation and/or transmission scheme.

Although embodiments of the invention are not limited in this respect, types of antennae that may be used for antennas 110 and/or 126 may include but are not limited to internal antenna, dipole antenna, omni-directional antenna, a monopole antenna, an end fed antenna, a circularly polarized antenna, a micro-strip antenna, a diversity antenna and the like.

In some demonstrative embodiments, video source 104 and wireless video source module 106 may be implemented as part of a video source device 102, e.g., such that video source 104 and wireless video source module 106 are enclosed in a common housing, packaging, or the like. In other embodiments, video source 104 and wireless video source module 106 may be implemented as separate devices.

In some demonstrative embodiments, video destination 122 and wireless video destination module 122 may be implemented as part of a video destination device 120, e.g., such that video destination 122 and wireless video destination module 122 are enclosed in a common housing, packaging, or the like. In other embodiments, video destination 122 and wireless video destination module 122 may be implemented as separate devices.

In some demonstrative embodiments, wireless video source module 106 may include or may be implemented as a wireless communication card, which may be attached to video source 104 externally or internally.

In some demonstrative embodiments, wireless video destination module 122 may include or may be implemented as a wireless communication card, which may be attached to video destination 124 externally or internally.

In some demonstrative embodiments, downlink transmission 121 may include, for example, a HDTV video transmission or any other suitable video transmission.

In some demonstrative embodiments, video source 104 and/or video source device 102 may include any suitable video device or module, for example, a portable video source, a non-portable video source, a Set-Top-Box (STB), a DVD, a digital-video-recorder, a game console, a PC, a portable computer; a Personal-Digital-Assistant (PDA), a Video Cassette Recorder (VCR), a video camera, a cellular phone, a video player, a portable-video-player, a portable DVD player, an MP-4 player, a video dongle, a cellular phone, and the like, Video destination 124 and/or video destination device 120 may include any suitable video display or receiver to handle video data 128. For example, video destination 124 and/or video destination device 120 may include a display or screen, e.g., a flat screen display, a Liquid Crystal Display (LCD), a plasma display, a back projection television, a television, a projector, a monitor, an audio/video receiver, a video dongle, and the like.

In some demonstrative embodiments, wireless video source module 106 and/or wireless video destination module 122 may be designed to allow a relatively simple and/or efficient implementation of wireless video source module 106 and/or wireless video destination module 122, for example, using an integrated circuit, e.g., an Application Specific Integrated Circuit (ASIC), as described herein.

In some demonstrative embodiments, downlink receiver 130 may share one or more elements or components with uplink transmitter 132. In one example, wireless video destination module 122 may include a FFT module 165 and/or a Radio-Frequency (RF) module 164, which may be shared by both downlink receiver 130 and uplink transmitter 132, e.g., as described below.

In some demonstrative embodiments, downlink transmitter 112 may share one or more elements or components with uplink receiver 114. In one example, wireless video source module 106 may include an Inverse-FFT (IFFT) module 167 and/or a RF module 166, which may be shared by both downlink transmitter 112 and uplink receiver 114, e.g., as described below.

Figure 2:
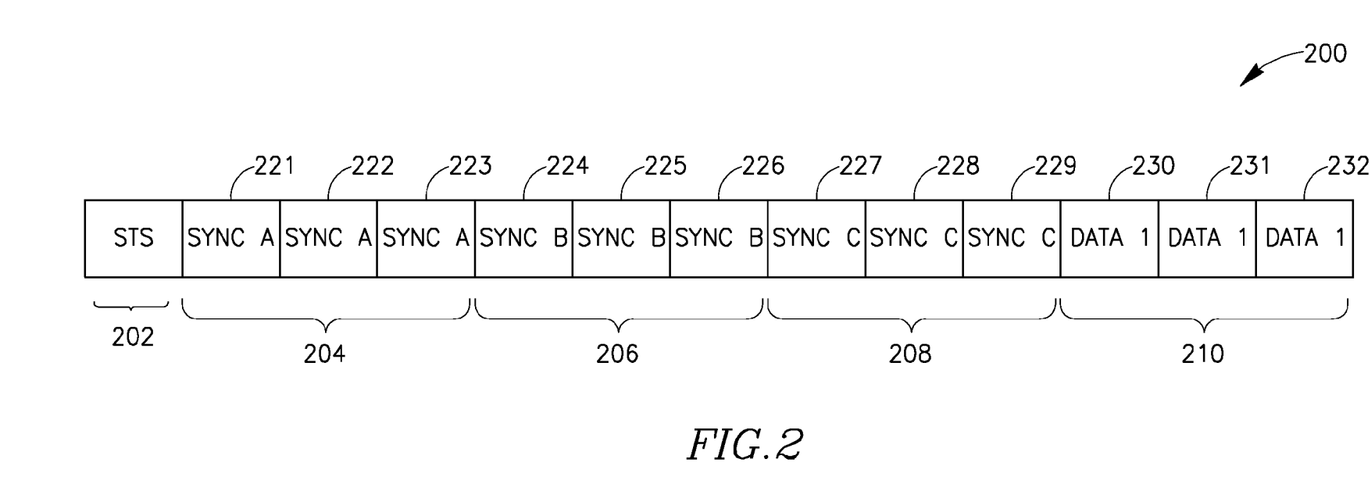
FIG. 2 is a schematic illustration of a wireless uplink initialization frame in accordance with some demonstrative embodiments.

Reference is now made to FIG. 2, which schematically illustrates a wireless uplink initialization frame 200 in accordance with some demonstrative embodiments. In some non-limiting embodiments, frame 200 may be transmitted by uplink transmitter 132 (FIG. 1), for example, as part of uplink transmission 123, e.g., during an initialization mode of operation.

In some demonstrative embodiments, frame 200 may include a symbol 202 including a short training sequence (STS), which may be used, for example, by an automatic gain control (AGC) module of uplink receiver 114 (FIG. 1). For example, STS symbol 202 may include a predefined symbol, which may be used by the AGC module to set low noise amplifier (LNA) and/or a variable gain amplifier (VGA) values of uplink receiver 114 (FIG. 1).

In some demonstrative embodiments, frame 200 may include one or more synchronization sequences followed by one or more data sequences. One or more of the synchronization sequences may include two or more consecutive repetitions of a predefined synchronization symbol, and one or more of the data sequences may include two or more consecutive repetitions of at least one data symbol, e.g., as described below.

In some demonstrative embodiments, frame 200 may include a first synchronization sequence 204, followed by a second synchronization sequence 206, which in turn may be followed by a third synchronization sequence 208.

In some demonstrative embodiments, synchronization sequence 204 may include at least two repetitions of a first predefined synchronization symbol, denoted "SYNC-A". For example, synchronization sequence 204 may include a sequence of three symbols 221, 222, and 223, each including the synchronization symbol SYNC-A.

In some demonstrative embodiments, synchronization sequence 206 may include at least two repetitions of a second predefined synchronization symbol, denoted "SYNC-B". For example, synchronization sequence 206 may include a sequence of three symbols 224, 225, and 226, each including the synchronization symbol SYNC-B.

In some demonstrative embodiments, synchronization sequence 208 may include at least two repetitions of a third synchronization symbol, denoted "SYNC-C". For example, synchronization sequence 208 may include a sequence of three symbols 227, 228, and 229, each including the synchronization symbol SYNC-C.

In some demonstrative embodiments, the third synchronization symbol may include or may be the first synchronization symbol. For example, the synchronization symbol SYNC-C may be identical to the synchronization symbol SYNC-A, e.g., SYNC-C=SYNC-A. In other embodiments, the first, second and/or third synchronization symbols may include any other suitable scheme of symbols.

In some demonstrative embodiments, frame 200 may include at least one data sequence 210 following synchronization sequence 208. Data sequence 210 may include at least two repetitions of a data symbol, denoted "DATA1". For example, data sequence 210 may include a sequence of three symbols 230, 231, and 232, each including the data symbol DATA1.

In some demonstrative embodiments, the data symbol DATA1 may include any suitable initialization data to initialize a connection with wireless source module 106 (FIG. 1). For example, the data symbol DATA1 may include any suitable identification information identifying wireless video destination module 122 (FIG. 1); and/or extended display identification data (EDID) corresponding to a configuration of video destination 124 (FIG. 1).

In some demonstrative embodiments, frame 200 may include an OFDM frame For example, symbols 202, 221, 222, 223, 224, 225, 226, 227, 228, 229, 230, 231, and/or 232 may include OFDM symbols, e.g., as described herein.

In some demonstrative embodiments, frequency bins of symbols 202, 221, 222, 223, 224, 225, 226, 227, 228, 229, 230, 231, and/or 232 may include On-Off-Keying (OOK) symbols, M-ary Phase Shift Keying (M-PSK) symbols, M-Order Quadrature Amplitude Modulation (M-QAM) symbols, and the like, each including a sequence of bits, e.g., as described below.

In some demonstrative embodiments, OOK symbols may implement a sequence of frequency bins turned on and off to create a sequence of binary '1' and '0' logic values.

In some demonstrative embodiments, the synchronization symbols SYNC-A, SYNC-B and/or SYNC-C may include a plurality of sets of frequency bins, and the data symbol DATA1 may include frequency bins of the plurality of sets of frequency bins. In one example, the synchronization symbols SYNC-A and SYNC-C may include a first set of frequency bins, synchronization symbol SYNC-B may include a second set of frequency bins, and the data symbol DATA1 may include both of the first and second sets, e.g., as described below.

In some demonstrative embodiments, the data symbol DATA1 may be represented by bins of a predefined set of active frequency bins, For example, the symbol DATA1 representing a data sequence of $b_1 b_2 \ldots b_k$ may include the FFT of the sequence $000b_1 00000b_2 0000 \ldots 0000b_k 000$ where bits $b_1 b_2 \ldots b_k$ are mapped to frequency bins $f_1 f_2 \ldots f_k$. Accordingly, symbols 230, 231 and 232 may include the frequency bins $f_1 f_2 \ldots f_k$; symbols 221, 222, 223, 227, 228 and 229 may include a first subset of the frequency bins $f_1 f_2 \ldots f_k$; and symbols 224, 225, and 226 may include a second subset of the frequency bins $f_1 f_2 \ldots f_k$, such that, for example, the first and second subsets include together the entire set of the active frequency bins.

In some demonstrative embodiments, the synchronization symbol SYNC-A includes a first binary value, and the synchronization symbol SYNC-B includes a second binary value, which is exclusive to the first binary value. For example, each of symbols 221, 222, 223, 224, 225, 226, 227, 228, and/or 229 may include a sequence of '0' and '1' logic values, e.g., 0101 . . . , wherein (SYNC-A) xor (SYNC-B)=1. The synchronization symbol SYNC-C may include includes a third binary value, e.g., equal to or different then the first binary value, which is exclusive to the second binary value, for example, (SYNC-B) xor (SYNC-C)=1

In some demonstrative embodiments, the number of active bins in data symbols 230, 231 and 232 may be a configurable parameter, which may depend, for example, on a current active mode of uplink transmitter 132 (FIG. 1).

In some demonstrative embodiments, the set of active bins may be selected based on any suitable criterion, e.g., not to include frequency bins of a detected narrow-band interferer.

In one example, the set of active bins may include three sets of active bins having an offset of one bin between each set.

Although some demonstrative embodiments are described herein with relation to an uplink transmission including OOK symbols, other embodiments may include an uplink transmission including any other suitable symbols, e.g., M-PSK symbols, M-QAM symbols, Quadrature Amplitude Modulation (QAM), Quadrature Phase-Shift Keying (QPSK) symbols, or the like.

In some demonstrative embodiments, at least one bit of symbols 221, 222, 223, 224, 225, 226, 227, 228, 229, 230, 231 and/or 232 may be mapped to at least two frequency bins, e.g., as described below.

In some demonstrative embodiments, each bit of symbols 221, 222, 223, 224, 225, 226, 227, 228, 229, 230, 231 and/or 232 may be mapped to achieve any suitable order of diversity. In one example, each bit of symbols 221, 222, 223, 224, 225, 226, 227, 228, 229, 230, 231 and/or 232 may be mapped to achieve a diversity of order two or four. For example, in order to achieve a diversity of order two a spectrum of a symbol including n bins may be divided to two halves, wherein each half of the spectrum includes n/2 of the bins. A bit may be mapped to both halves of the spectrum, e.g., to bins at locations k and −k. In order to achieve a diversity of order four, a bit may be mapped to four bins, two in each one of the halves of the spectrum. In one example, data symbols 230, 231 and/or 232 may include 32 active bins. Accordingly, sixteen data bits of the data symbol DATA1 may be mapped to the 32 bins of data symbols 230, 231 and/or 232. In one example, each bit of symbols 221, 222, 223, 224, 225, 226, 227, 228, 229, 230, 231 and/or 232 may be mapped to the same number of frequency bins, e.g., at least two frequency bins. In another example, bits of symbols 221, 222, 223, 224, 225, 226, 227, 228, 229, 230, 231 and/or 232 may be mapped to different numbers of frequency bins, e.g., one or more bits may be mapped to one frequency bin, one or more bits may be mapped to two frequency bins, and/or one or more bits may be mapped to any other suitable number of frequency bins.

In some demonstrative embodiments, a frequency offset between an uplink transmitter, e.g., uplink transmitter, 132 (FIG. 1), transmitting frame 200 and an uplink receiver, e.g., uplink receiver 114 (FIG. 1), receiving frame 200 may be relatively high, e.g., up to 45 parts per million (ppm). The uplink receiver may be capable of detecting the data bit in each bin of symbols 230, 231 and/or 232, for example, by summing the energy of a set of at least three adjacent bins, finding the bin with the maximum energy, and/or any combination thereof, e.g., as described in detail below with reference to FIG. 5.

Figure 3:
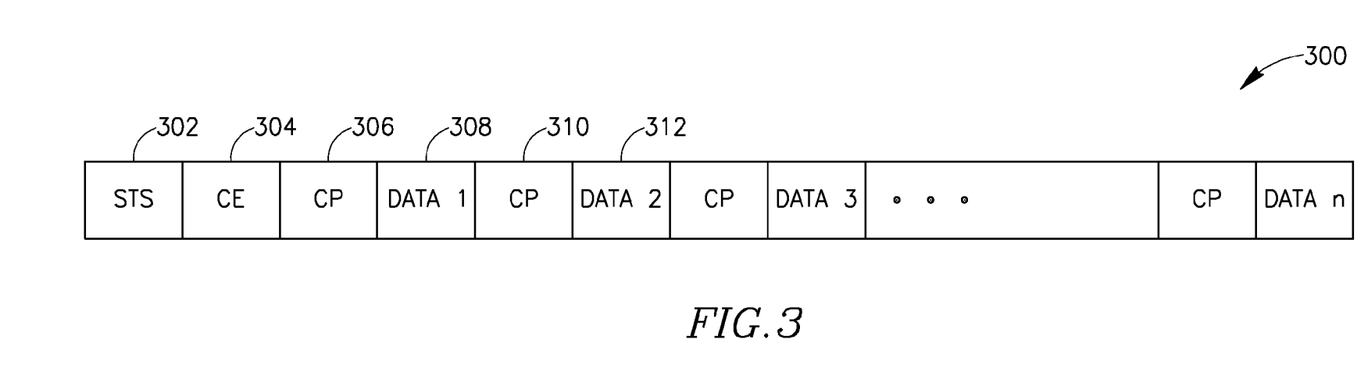
FIG. 3 is a schematic illustration of a wireless uplink data frame in accordance with some demonstrative embodiments.

Reference is now made to FIG. 3, which schematically illustrates a wireless uplink data frame 300 in accordance with some demonstrative embodiments. In some non-limiting embodiments, frame 300 may be transmitted by uplink transmitter 132 (FIG. 1), for example, as part of uplink transmission 123 during, for example, a data mode of operation.

In some demonstrative embodiments, frame 300 may include a STS symbol 302, which may be used, for example, by the AGC module of uplink receiver 114 (FIG. 1). For example, STS symbol 302 may include a predefined symbol, which may be used by the AGC module to set LNA and/or VGA values of uplink receiver 114 (FIG. 1).

In some demonstrative embodiments, frame 300 may include a plurality of data symbols e.g., data symbols 308 and 312, each preceded by a respective cyclic prefix (CP) symbol, e.g., symbols 306 and 310. Data symbols 308 and 312 may include one or more control, operation, and/or maintenance messages from wireless video destination module 122 (FIG. 1) to wireless video source module 106 (FIG. 1). The control messages may include, for example, control signals to control one or more downlink transmission parameters of downlink transmitter 112 (FIG. 1). In one example, a control message may include a request to downlink transmitter 112 (FIG. 1) to increase or decrease a transmission power of downlink transmission 121 (FIG. 1), to switch between transmission channel bands of downlink transmission 121 (FIG. 1), e.g., in the presence of an interference signal, and the like. The operation messages may include, for example, any suitable configuration information relating to video destination 124 (FIG. 1), video source 104 (FIG. 1), data 116 (FIG. 1), and/or data 128 (FIG. 1). In one example, an operation message may include a HDCP key exchange policy message, an encryption key, and the like.

In some demonstrative embodiments, frame 300 may also include a channel estimation (CE) symbol 304. Symbol 304 may include, for example, the logic value '1' in all of the active bins, for example, in order to enable uplink receiver 114 (FIG. 1) to discriminate between the logic values '0' and '1' in data symbols 308 and 312, e.g., as described below.

In some demonstrative embodiments, frame 300 may include an OFDM frame. For example, symbols 302, 304, 306, 308, 310, and/or 312 may include OFDM symbols, e.g., as described herein.

In some demonstrative embodiments, frequency bins of symbols 302, 304, 306, 308, 310, and/or 312 may include OOK symbols, M-PSK symbols, M-QAM symbols, and the like, each including a sequence of bits, e.g., as described below.

In some demonstrative embodiments, data symbols 308 and/or 312 may be represented by bins of a predefined set of active frequency bins. For example, data symbols 308 and/or 312 may include the active frequency bins of an initialization frame, for example an active set of bins including the frequency bins of the synchronization symbols SYNC-A, SYNC-B and/or SYNC-C, e.g., the active frequency bins $f_1 f_2 \ldots f_k$, as described above.

In some demonstrative embodiments, at least one bit of symbols 308 and/or 312 may be mapped to at least two frequency bins. For example, one or more bits of symbols 308 and/or 312 may be mapped to achieve any suitable order of diversity. For example, one or more bits of symbols 308 and/or 312 may be mapped to achieve a diversity of order two or four, e.g., as described above with reference to FIG. 2. In one example, each bit of symbols 308 and/or 312 may be mapped to the same number of frequency bins, e.g., at least two frequency bins. In another example, bits of symbols 308 and/or 312 may be mapped to different numbers of frequency bins, e.g., one or, more bits may be mapped to one frequency bin, one or more bits may be mapped to two frequency bins, and/or one or more bits may be mapped to any other suitable number of frequency bins.

In some demonstrative embodiments, a frequency offset between an uplink transmitter, e.g., uplink transmitter 132 (FIG. 1), transmitting frame 300 and an uplink receiver, e.g., uplink receiver 114 (FIG. 1), receiving frame 300 may be relatively high, e.g., up to 45 ppm. The uplink receiver may be capable of pre-correcting and/or pre-adjusting the frequency offset, for example, based on a downlink frequency synchronization and/or a downlink timing synchronization of a received downlink transmission, e.g., as described below.

Figure 4:
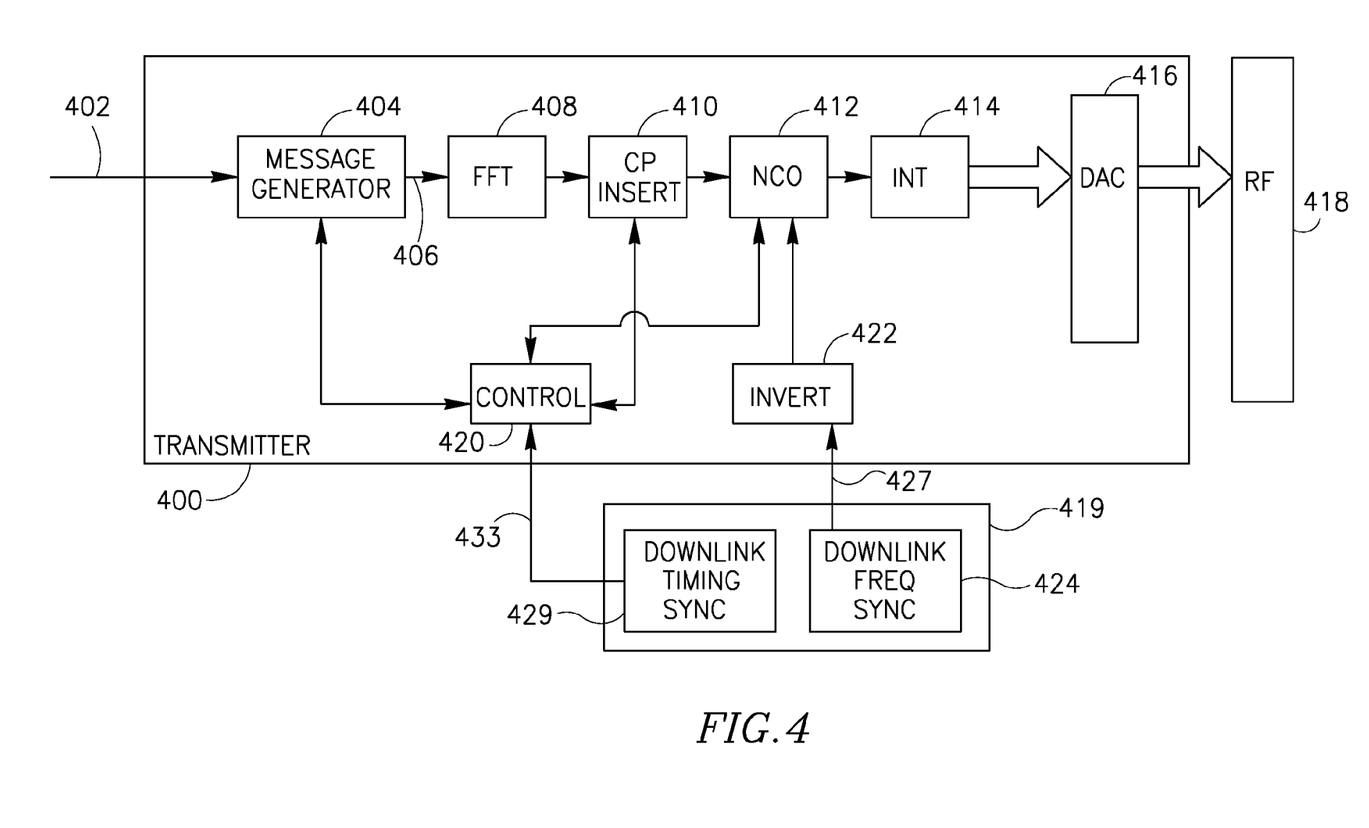
FIG. 4 is a schematic illustration of an uplink transmitter in accordance with some demonstrative embodiments.

Reference is now made to FIG. 4, which schematically illustrates an uplink transmitter 400 in accordance with some demonstrative embodiments. In some non-limiting embodiments, uplink transmitter may perform the functionality of uplink transmitter 132 (FIG. 1).

In some demonstrative embodiments, uplink transmitter 400 may include a message generator 404, a FFT module 408, a CP inserter 410, a Numerically Controlled Oscillator (NCO) 412, a controller 420, an inverter 422, an interpolator 414, a Digital-Analog converter (DAC) 416, and/or a radio frequency (RF) module 418, e.g., as are described in detail below.

In some demonstrative embodiments, uplink transmitter 400 may operate at an initialization mode of operation, and a data mode of operation, erg, as are described above.

In some demonstrative embodiments, during the data mode of operation uplink transmitter may transmit an uplink data frame, e.g., frame 300 (FIG. 3) corresponding to an input message 402. Input message 402 may include a data field, and an address field of an intended uplink receiver, e.g., receiver 114 (FIG. 1). Input message 402 may optionally include a Cyclic Redundancy Check (CRC) value for allowing error detection and/or correction by the intended uplink receiver.

In some demonstrative embodiments, message generator 404 may map data bits of input message 402 to a plurality of data symbols 406 including the predefined set of active bins, e.g., bins $f_1 f_2 \ldots f_k$, as described above. For example, data symbols 406 may include data symbols 308 and 312 (FIG. 3). Message generator 404 may be capable of selecting the set of active bins, for example, in the presence of a narrow-band interferer. In one example, the set of active bins may include three sub-sets of active bins having an offset of one bin between each sub-set.

In some demonstrative embodiments, message generator 404 may map the data bits of message 402 according to any suitable mapping scheme, e.g., to any suitable order of diversity, e.g., such that a data bin is mapped to at least two or four frequency bins, as described above.

In some demonstrative embodiments, FFT module 408 may apply a FFT function to symbols 406. In some non-limiting embodiments, FFT module 408 may include or may be shared with a FFT module of a downlink receiver 419, e.g., downlink receiver 130 FIG. 1), associated with uplink transmitter 400. Accordingly, the FFT function applied by FFT module 408 may include an FFT function applied to a downlink transmission received by downlink receiver 419, e.g., downlink transmission 121 (FIG. 1); and/or may be an inverse of an IFFT function applied to downlink transmission 121 (FIG. 1) by downlink transmitter 112 (FIG. 1), e.g., as follows:

$$iFFT(x) = \frac{1}{N}\{G[FFT(f(x))]\} \quad (1)$$

In some demonstrative embodiments, CP inserter 410 may insert to each one of the data symbols a CP, which may include, for example, a repeat of a part, e.g., the end, of the data symbol at the beginning of the data symbol. The length of the CP may be equal to a predefined guard interval, which may be shorter than a length of the data symbol, e.g., a third of the length of the data symbol.

In some demonstrative embodiments, uplink transmitter 400 may synchronize between the uplink data frame and a video frame of the downlink video transmission, e.g., downlink transmission 121 (FIG. 1). For example, inverter 422 may receive a frequency offset signal 427, e.g., from a downlink frequency synchronizer 424 of downlink receiver 419. Signal 427 may represent a synchronization offset corresponding to downlink transmission 121 (FIG. 1) between downlink receiver 419 and downlink transmitter 112 (FIG. 1).

Inverter 422 may invert the frequency of signal 427 and provide an inverted frequency signal to NCO 412, NCO 412 may apply to the data frame a frequency offset corresponding to the inverted frequency signal. As a result, the data frame transmitted by uplink transmitter 400 may be received by an uplink receiver, e.g., uplink receiver 114 (FIG. 1), at a substantially reduced frequency offset, for example, substantially lower than 45 ppm, e.g., lower than 20 ppm.

In some demonstrative embodiments, interpolator 414 may generate a sample stream by applying any suitable interpolation to the output of NCO 412, DAC 416 may convert the sample stream into analog signals, and RE module 418 may perform RF operations to the analog signals, e.g., including frequency-division multiplexing (FDM) of the analog signals, and transmitting the analog signals via one or more antennas, Controller 420 may control message generator 404, CP inserter 410 and/or NCO 412, e.g., at least to trigger the insertion of the CP, setting NCO 410 with a default frequency value, and/or controlling message generator 404 to operate in either of the initialization and data modes. In one example, controller 420 may control a timing of the transmission of the uplink transmission based, for example, on a timing synchronization signal 433, e.g., from a downlink timing synchronizer 429 of downlink receiver 419.

In some demonstrative embodiments, uplink transmitter 400 may switch to the initialization mode upon a command from controller 420. Uplink transmitter 400 may transmit an initialization frame, e.g., frame 200 (FIG. 2), to perform, for example, a timing synchronization with an uplink receiver, e.g., uplink receiver 114 (FIG. 1). The initialization frame may include one or more synchronization sequences followed by one or more data sequences, wherein each of the synchronization sequences includes two or more consecutive repetitions of a predefined synchronization symbol, and wherein each of the data sequences includes two or more consecutive repetitions of a data symbol, e.g., as described above with reference to FIG. 2. Each of the synchronization sequences may include a synchronization symbol, e.g., the synchronization symbol SYNC-A, SYNC-B, and/or SYNC-C, and one or more repetitions of the synchronization symbol, e.g., as described above. The one or more repetitions of the synchronization symbol may serve as a long CP of the synchronization symbol having a length of at least the length of the synchronization symbol. For example, in sequence 204 (FIG. 2) symbols 221 and 222 may serve as a long CP of symbol 223, such that the long CP may have the length of twice the length of symbol 223. The long CP may allow avoiding inter-symbol interferences, which may affect the transmission of frame 200 (FIG. 2), and/or maintaining an orthogonality of the synchronization symbols of frame 200 (FIG. 2).

Figure 5:
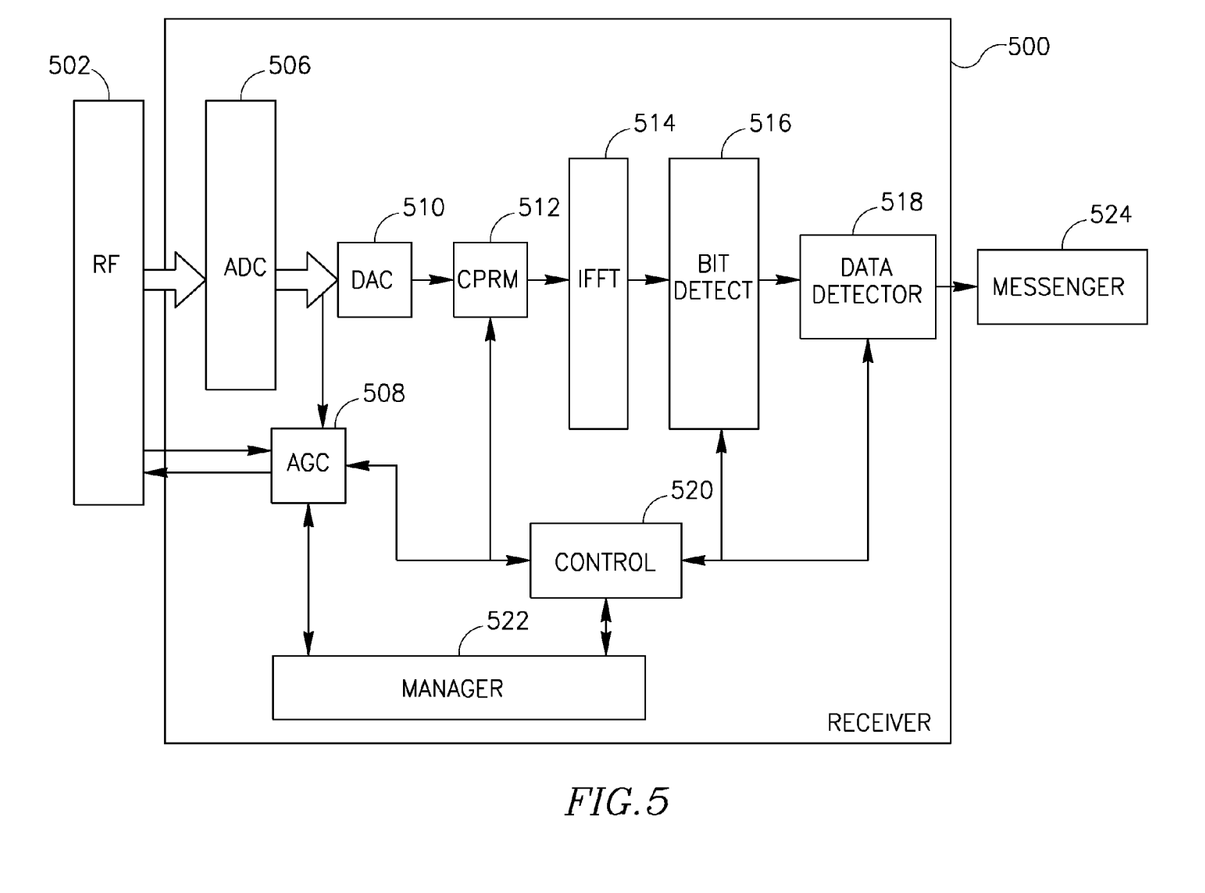
FIG. 5 is a schematic illustration of an uplink receiver in accordance with some demonstrative embodiments.

Reference is made to FIG. 5, which schematically illustrates an uplink receiver 500 in accordance with some demonstrative embodiments. In some non-limiting embodiments, uplink receiver 500 may perform the functionality of uplink receiver 114 (FIG. 1). For example, uplink receiver 500 may be capable of receiving and/or constructing messages of transmitted by uplink transmitter 132 (FIG. 1), e.g., as part of uplink transmission 123 (FIG. 1), during the initialization and data modes of operation.

In some demonstrative embodiments, uplink receiver 500 may include an RF module 502 to generate analog signals 504 corresponding to wireless received signals, e.g., of uplink transmission1 123 (FIG. 1). Uplink receiver 500 may also include an analog-to-digital (ADC) converter to convert signals 504 into a sample stream; a CP remover to remove CP symbols from the sample stream; and an IFFT module 514 to perform an IFFT function on the symbols of the sample stream. IFFT module 514 may include, or may be implemented by an IFFT module of a downlink transmitter, e.g., downlink transmitter 112 (FIG. 1) associated with uplink receiver 500. Accordingly, the IFFT function applied by IFFT module 514 may include an IFFT function applied to a downlink transmission transmitted by downlink transmitter 112 (FIG. 1), e.g., downlink transmission 121 (FIG. 1).

As discussed above, when receiving a frame, e.g., frame 200 (FIG. 2) or frame 300 (FIG. 3), a frequency offset between uplink receiver 500 and an uplink transmitter, e.g., uplink transmitter 132 (FIG. 1), transmitting the frame may be relatively high, e.g., up to 45 ppm.

In some demonstrative embodiments, uplink receiver 500 may also include a bit detection module capable of detecting the data bits of data symbols of the received frame, for example, by summing the energy of three adjacent bins, finding the bin with the maximum energy, and/or any combination thereof, e.g., as described below.

In some demonstrative embodiments, bit detector 516 may include a squared-absolute-value-maximum-and-delay (AMD) module capable of detecting a data bit assumed to be transmitted over a frequency bin, denoted k, based on a set of frequency bins corresponding to the frequency bin k. The set of frequency bins may include, for example, the frequency bin k; a frequency bin k+1 adjacent to and succeeding the frequency bin k; a frequency bin k−1 adjacent to and preceding the frequency bin k; a frequency bin (−k) opposite to the frequency bin k; a frequency bin (−k+1) adjacent to and succeeding the frequency bin (−k); and a frequency bin (k−1) adjacent to and preceding the frequency bin (−k).

In some demonstrative embodiments, bit detector 516 may determine a square of an absolute value of each bin of the set, e.g., to determine the values $|-k-1|^2$, $|-k|^2$, $|-k+1|^2$, $|k-1|^2$, $|k|^2$, and $|k+1|^2$. In one example, bit detector 516 may determine a plurality of sum values corresponding to each pair of opposite bins, e.g., $|-k-1|^2+|k-1|^2$, $|-k|^2+|k|^2$, and $|-k+1|^2$. Bit detector 516 may also apply any detection function to the sum values in order to determine the data bit corresponding to the frequency bit k. For example, bit detector 516 may determine the data bit based on the function SUM($|-k-1|^2+|k-1|^2$, $|-k|^2+|k|^2$, $|-k+1|^2$), the function MAX($|-k-1|^2+|k-1|^2$, $|-k|^2+|k|^2$, $|-k+1|^2$), and/or any combination thereof.

In some demonstrative embodiments, bit detector 516 may also include one or more delay modules to add a delay corresponding to a distance between scanning windows implemented to detect symbols of an uplink initialization frame, e.g., as described below with reference to FIG. 6.

In some demonstrative embodiments, uplink receiver 500 may also include a data detector 518 to detect one or more data symbols of a received uplink data frame, e.g., frame 300 (FIG. 3). For example, detector may use a CE symbol, e.g., symbol 304 (FIG. 3), to discriminate between '0' and '1' logic values of data in symbols 308 and 312. In one example data detector 518 may sum the power of the received data symbols 308 (FIG. 3) and 312 (FIG. 3) in all the bins that contain a certain data bit, e.g., the bins k and −k. The same operation is performed on the CE symbol. If the received power is greater than a predefined fraction of the corresponding power in the CE symbol, the bit is determined to have the logic value '1'; otherwise, it is determined to have the logic value '0'. If a data bit is mapped to three adjacent frequency bins, e.g., as described above, then data detector 518 may detect the data bit, for example, by summing the energy of three adjacent bins, finding the bin with the maximum energy, and/or any combination thereof.

In some demonstrative embodiments, uplink receiver 500 may also include an AGC module 508 capable of setting INA and/or VGA values of uplink receiver 500, e.g., based on an STS symbol of a received uplink frame, e.g., symbol 202 (FIG. 2) of initialization frame 200 (FIG. 2), or STS 302 (FIG. 3) of data frame 300 (FIG. 3).

In some demonstrative embodiments, uplink receiver 500 may implement a state machine to detect the synchronization symbols of frame 200 (FIG. 2), e.g., as described below with reference to FIG. 6. Based on the detected synchronization symbols uplink receiver 500 may estimate an uplink channel between uplink receiver 500 and uplink transmitter 132 (FIG. 1).

Figure 6:
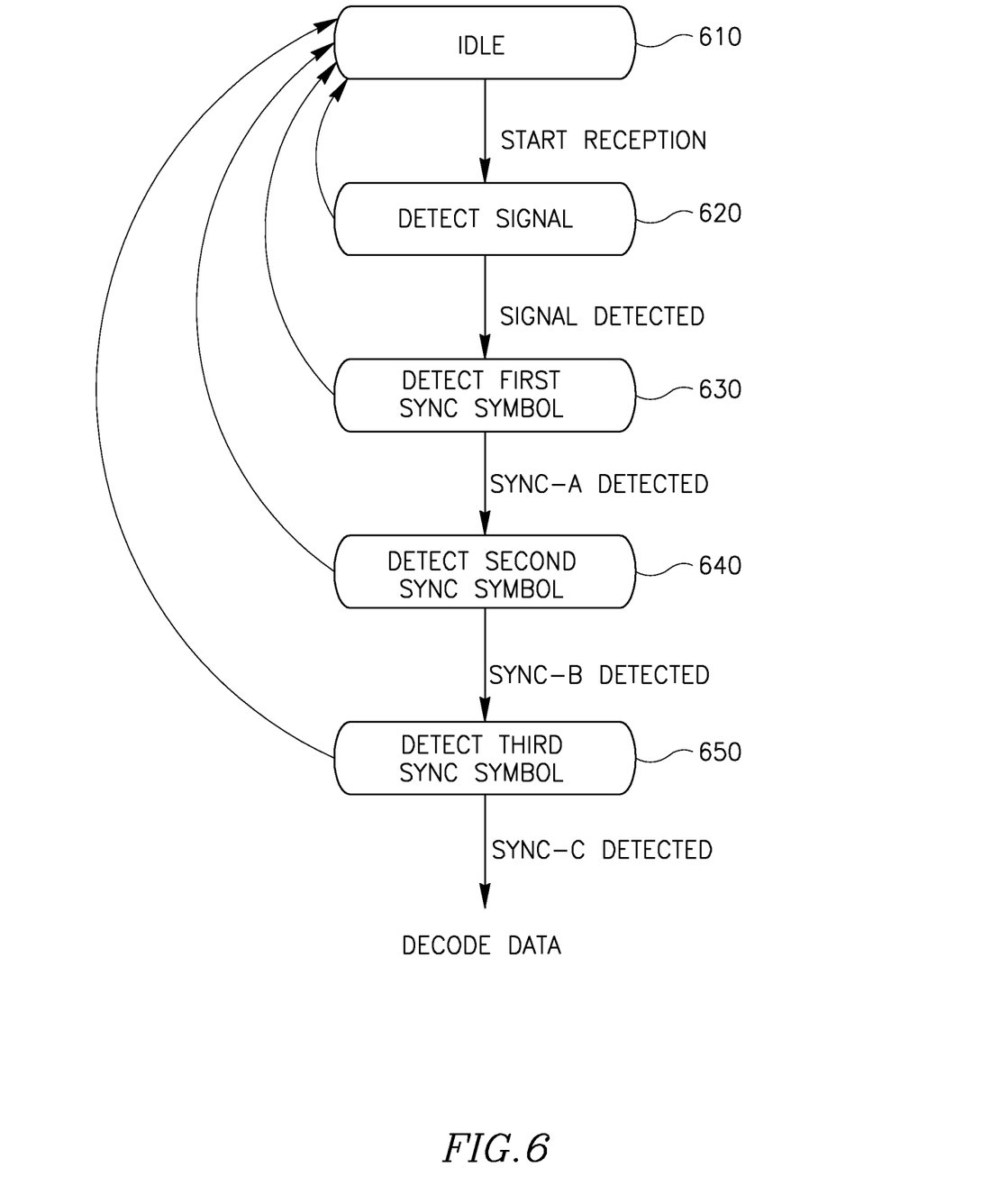
FIG. 6 is a schematic illustration of a sequence of states of detecting a synchronization sequence, in accordance with some demonstrative embodiments.

Reference is also made to FIG. 6, which schematically a sequence 600 of states of detecting a synchronization sequence, in accordance with some demonstrative embodiments. In some non-limiting embodiments, one or more states of sequence 600 may be implemented by a state machine of uplink receiver 500 to detect an initialization uplink frame, e.g., frame 200 (FIG. 2).

In some demonstrative embodiments, sequence 600 may include an idle state 610. For example, when at idle state 610, uplink receiver 500 may wait for a start reception instruction to detect an initialization uplink frame.

In some demonstrative embodiments, upon receiving the start reception instruction, the state machine may switch to a state 620, in which uplink receiver 500 may attempt to detect a RF signal and lock on an STS symbol, e.g., STS symbol 202 (FIG. 2). The state machine may return to state 610 after a predefined time-out period, e.g., if AGC module 508 does not lock on an RF signal. The attempt to detect an RF signal may be performed, for example, oil another frequency channel. For example, uplink receiver 500 may switch to another frequency channel.

In some demonstrative embodiments, upon detecting the RF signal and locking on the STS symbol, the state machine may switch to state 630, in which an attempt is made to detect at least two repetitions of a first synchronization symbol, e.g., the synchronization symbol SYNC-A of sequence 204 (FIG. 1). For example, uplink receiver 500 may use two scanning windows, each of which having a size of the symbol SYNC-A. A distance between the scanning windows may be equal, for example, to three times the length of the symbol SYNC-A. In one example, uplink receiver 500 may detect the symbol SYNC-A based on a comparison between energy values corresponding the first and second scanning window. For example, if the first scanning window is placed on a first SYNC-A symbol, e.g., symbol 221 (FIG. 2), and the second scanning window is placed on a first SYNC-B symbol, e.g., symbol 224 (FIG. 2), then the difference between the energies of the first and second scanning windows may have the same binary pattern as the synchronization symbol SYNC-A, since the symbols SYNC-A and SYNC-B are exclusive, e.g., as descried above. Accordingly, uplink receiver 500 may detect the symbol SYNC-A, e.g., if the difference between the energies of the first and second scanning windows has the same binary pattern as the synchronization symbol SYNC-A. The scanning windows may be advanced by one symbol, e.g., to detect the second SYNC-A symbol; and by another symbol, e.g., to detect the third SYNC-A symbol. The state machine may switch to a state 640, e.g., if at least two SYNC-A symbols are detected. Otherwise, the state machine may return to State 610.

In some demonstrative embodiments, at state 640 an attempt is made to detect at least two repetitions of a second synchronization symbol, e.g., the synchronization symbol SYNC-B of sequence 206 (FIG. 1). For example, uplink receiver 500 may use two scanning windows, each of which having a size of the symbol SYNC-B. A distance between the scanning windows may be equal, for example, to three times the length of the symbol SYNC-B. In one example, uplink receiver 500 may detect the symbol SYNC-A based on a comparison between energy values corresponding the first and second scanning window. For example, if the first scanning window is placed on a first SYNC-B symbol, ergs symbol 224 (FIG. 2), and the second scanning window is placed on a first SYNC-C symbol, e.g., symbol 227 (FIG. 2), then the difference between the energies of the first and second scanning windows may have the same binary pattern as the synchronization symbol SYNC-B, since the symbols SYNC-B and SYNC-C are exclusive, e.g., as descried above. Accordingly, uplink receiver 500 may detect the symbol SYNC-B, e.g., if the difference between the energies of the first and second scanning windows has the same binary pattern as the synchronization symbol SYNC-B. The scanning windows may be advanced by one symbol, e.g., to detect the second SYNC-B symbol; and by another symbol, e.g., to detect the third SYNC-B symbol. The state machine may switch to a state 650, e.g., if at least two SYNC-B symbols are detected. Otherwise, the state machine may return to State 610

In some demonstrative embodiments, at state 650 an attempt is made to detect at least two repetitions of a second synchronization symbol, e.g., the synchronization symbol SYNC-C of sequence 208 (FIG. 1). For example, a channel estimation may be performed based on the detected synchronization symbols SYNC_A and SYNC_B, The symbol SYNC_C may then be detected by comparing the energy of each received symbol to the energy of the symbol SYNC-C. If at least two SYNC-C symbols are detected, uplink receiver 500 may achieve a timing synchronization, decode one or more data symbols. Otherwise, the state machine may return to State 610.

Figure 7:
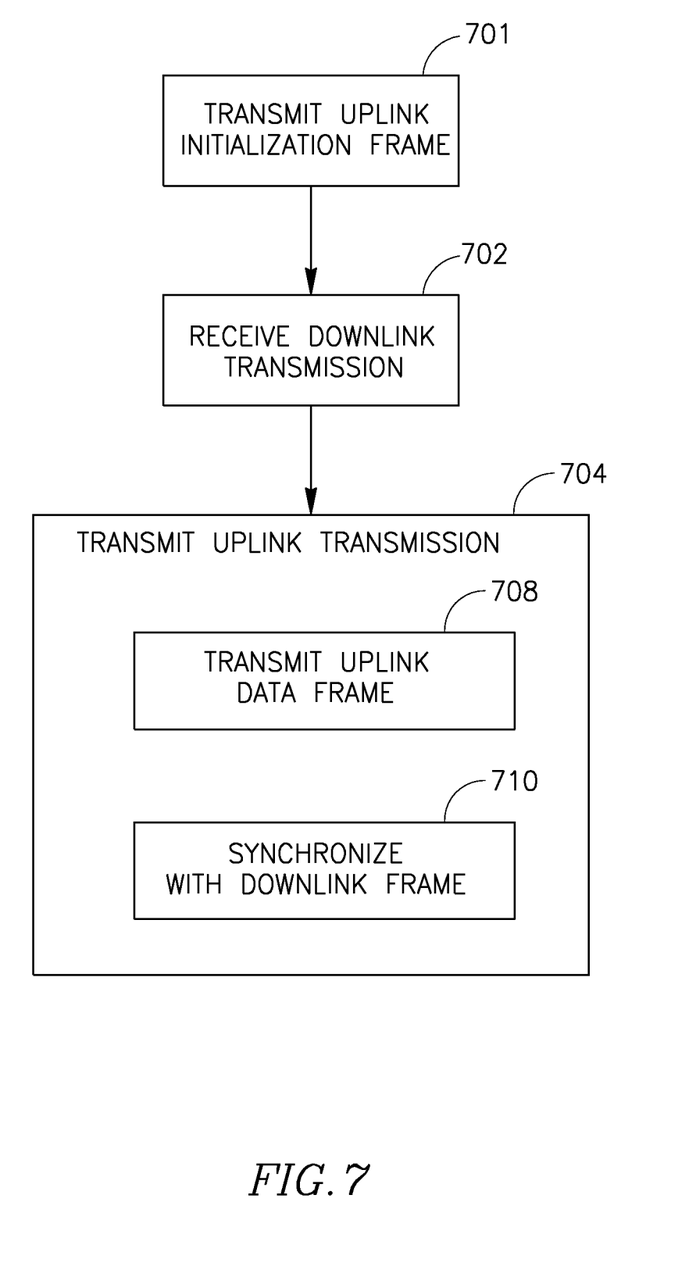
FIG. 7 is a schematic flow-chart illustration of a method of wireless uplink communication in accordance with some demonstrative embodiments.

Reference is now made to FIG. 7, which schematically illustrates a method of wireless uplink communication in accordance with some demonstrative embodiments. In some non-limiting embodiments, on or more operation of the method of FIG. 7 may be performed by one or more elements of a video system, e.g., system 100 (FIG. 1), for example, a wireless video destination module, e.g., wireless video destination module 122 (FIG. 1), and/or a wireless video source module, e.g., wireless video source module 106 (FIG. 1).

As indicated at block 702, the method may include receiving a wireless downlink video transmission from a video source module. For example, downlink receiver 130 (FIG. 1) may receive downlink transmission 121 (FIG. 1) from downlink transmitter 114 (FIG. 1), e.g., as described above.

As indicated at block 701, the method may include transmitting to the wireless video source module an uplink transmission including an initialization frame to initialize a connection to the video source module. For example, uplink transmitter 132 (FIG. 1) may transmit uplink transmission 123 (FIG. 1) including uplink initialization frame 200 (FIG. 2) to uplink receiver 112 (FIG. 1), e.g., as described above.

In some demonstrative embodiments, the uplink initialization frame may include one or more synchronization sequences followed by one or more data sequences, e.g., as described above.

In some demonstrative embodiments, each of the synchronization sequences may include two or more consecutive repetitions of a predefined synchronization symbol, and/or each of the data sequences may include two or more consecutive repetitions of a data symbol, erg, as described above.

In some demonstrative embodiments, at least one of the data and synchronization symbols may include a plurality of bits, wherein each of the bits is mapped to at least two frequency bins, e.g., as described above.

As indicated at block 704, the method may include transmitting an uplink transmission to the wireless video source module. For example, uplink transmitter 132 (FIG. 1) may transmit to uplink receiver 112 (FIG. 1) uplink transmission 123 (FIG. 1), e.g., as described above.

As indicated at block 708, in some demonstrative embodiments transmitting the uplink transmission may include transmitting an uplink data frame over the uplink connection. For example, uplink transmitter 132 (FIG. 1) may transmit uplink data frame 300 (FIG. 3) to uplink receiver 112 (FIG. 1), e.g., as described above.

In some demonstrative embodiments, the uplink data frame may include a plurality of DFT data symbols, for example, FFT data symbols, e.g., having an inverse of an IFFT function applied to symbols of the downlink transmission, e.g., as described above.

As indicated at block 710, in some demonstrative embodiments the method may also include synchronizing between the uplink data frame and a video frame of the downlink video transmission, e.g., as described above.

Some embodiments may be implemented by software, by hardware, or by any combination of software and/or hardware as may be suitable for specific applications or in accordance with specific design requirements. Some embodiments may include units and sub-units, which may be separate of each other or combined together, in whole or in part, and may be implemented using specific, multi-purpose or general processors, or devices as are known in the art. Some embodiments may include buffers, registers, storage units and/or memory units, for temporary or long-term storage of data and/or in order to facilitate the operation of a specific embodiment.

While certain features have been illustrated and described herein, many modifications, substitutions, changes, and equivalents may occur to those of ordinary skill in the art. It is, therefore, to be understood that the appended claims are intended to cover all such modifications and changes as fall within the true spirit of the invention.

What is claimed is:
1. An apparatus comprising:
a downlink receiver to receive a wireless downlink video transmission from a video source module; and
an uplink transmitter to transmit to said wireless video source module a wireless uplink initialization frame to initialize a connection to said video source module,
wherein said uplink initialization frame includes one or more synchronization sequences followed by one or more data sequences,
wherein each of said synchronization sequences includes two or more consecutive repetitions of a predefined synchronization symbol,
wherein each of said data sequences includes two or more consecutive repetitions of a data symbol;
wherein said one or more synchronization sequences include a first synchronization sequence followed by a second synchronization sequence,
wherein said first synchronization sequence includes at least two repetitions of a first synchronization symbol,
wherein said second synchronization sequence includes at least two repetitions of a second synchronization symbol; and
wherein said one or more synchronization sequences include a third synchronization sequence following said second synchronization sequence and including at least two repetitions of said first synchronization symbol.

2. The apparatus of claim 1, wherein said first and second synchronization symbols include first and second sets of frequency bins, respectively, and wherein said data symbol includes frequency bins of both of said first and second sets.

3. The apparatus of claim 2, wherein said first set of frequency bins is logically exclusive to said second set of frequency bins.

4. The apparatus of claim 1, wherein at least one of said data and synchronization symbols includes a plurality of bits, wherein each of said bits is mapped to at least two frequency bins.

5. The apparatus of claim 4, wherein each of said bits is mapped to at least four frequency bins.

6. The apparatus of claim 1, wherein one or more of said synchronization sequences includes three repetitions of a synchronization symbol, and wherein one or more of said data sequences includes three repetitions of a data symbol.

7. The apparatus of claim 1, wherein said uplink transmitter is to transmit to said wireless video source module a wireless uplink data frame over said connection.

8. The apparatus of claim 7, wherein said uplink data frame includes a plurality of Discrete-Fourier-transform data symbols.

9. The apparatus of claim 7, wherein said uplink transmitter is to synchronize between said uplink data frame and said downlink transmission.

10. The apparatus of claim 7, wherein said uplink transmitter is to synchronize between said uplink data frame and said downlink transmission based on a frequency offset corresponding to a frame of said downlink transmission.

11. The apparatus of claim 7, wherein at least one data symbol of said data frame includes a plurality of bits, wherein at least one of said bits is mapped to at least two frequency bins.

12. The apparatus of claim 1, wherein one or more of said synchronization and data symbols comprises an orthogonal-frequency-division-multiplexing symbol.

13. The apparatus of claim 1, wherein one or more of said synchronization and data symbols comprises a discrete-Fourier-transform.

14. The apparatus of claim 1, wherein at least one bin of one or more of said synchronization and data symbols is an on-off-keying symbol, an M-ary Phase Shift Keying symbol, or an M-Order Quadrature Amplitude Modulation symbol.

15. The apparatus of claim 1 comprising a display to display a video image corresponding to said downlink video transmission.

16. A method of wireless video communication, the method comprising:
receiving a wireless downlink video transmission from a video source module; and
transmitting to said wireless video source module a wireless uplink initialization frame to initialize a connection to said video source module,
wherein said uplink initialization frame includes one or more synchronization sequences followed by one or more data sequences,
wherein each of said synchronization sequences includes two or more consecutive repetitions of a predefined synchronization symbol,
wherein each of said data sequences includes two or more consecutive repetitions of a data symbol;
wherein said one or more synchronization sequences include a first synchronization sequence followed by a second synchronization sequence,
wherein said first synchronization sequence includes at least two repetitions of a first synchronization symbol,
wherein said second synchronization sequence includes at least two repetitions of a second synchronization symbol, and
wherein said one or more synchronization sequences include a third synchronization sequence following said second synchronization sequence and including at least two repetitions of said first synchronization symbol.

17. The method of claim 16, wherein said first and second synchronization symbols include first and second sets of frequency bins, respectively, and wherein said data symbol includes frequency bins of both of said first and second sets.

18. The method of claim 16, wherein at least one of said data and synchronization symbols includes a plurality of bits, wherein at least one of said bits is mapped to at least two frequency bins.

19. The method of claim 16 comprising transmitting to said wireless video source module a wireless uplink data frame over said connection.

20. The method of claim 19 comprising synchronizing between said uplink data frame and said downlink transmission.

21. A system comprising:
a video source to transmit a wireless downlink video transmission;
a video destination including:
a downlink receiver to receive said wireless downlink video transmission; and
an uplink transmitter to transmit to said video source a wireless uplink initialization frame to initialize a connection to said video source,
wherein said uplink initialization frame includes one or more synchronization sequences followed by one or more data sequences,
wherein each of said synchronization sequences includes two or more consecutive repetitions of a predefined synchronization symbol,
wherein each of said data sequences includes two or more consecutive repetitions of a data symbol;
wherein said one or more synchronization sequences include a first synchronization sequence followed by a second synchronization sequence,
wherein said first synchronization sequence includes at least two repetitions of a first synchronization symbol,
wherein said second synchronization sequence includes at least two repetitions of a second synchronization symbol; and
wherein said one or more synchronization sequences include a third synchronization sequence following said second synchronization sequence and including at least two repetitions of said first synchronization symbol.

22. The system of claim 21, wherein said video source comprises a downlink transmitter to transmit said downlink transmission, and an uplink receiver to detect said initialization frame.

23. The system of claim 21, wherein at least one of said data and synchronization symbols includes a plurality of bits, wherein each of said bits is mapped to at least two frequency bins.

24. The system of claim 21, wherein said uplink transmitter is to transmit to said wireless video source module a wireless uplink data frame over said connection.

25. An apparatus comprising:
a downlink receiver to receive a wireless downlink video transmission from a video source module; and
an uplink transmitter to transmit to said wireless video source module a wireless uplink data frame, wherein said uplink transmitter is to synchronize between said uplink data frame and said downlink transmission;

wherein said uplink data frame includes one or more synchronization sequences followed by one or more data sequences, wherein each of said synchronization sequences includes two or more consecutive repetitions of a predefined synchronization symbol, wherein each of said data sequences includes two or more consecutive repetitions of a data symbol;

wherein said one or more synchronization sequences include a first synchronization sequence followed by a second synchronization sequence, wherein said first synchronization sequence includes at least two repetitions of a first synchronization symbol, wherein said second synchronization sequence includes at least two repetitions of a second synchronization symbol; and wherein said one or more synchronization sequences include a third synchronization sequence following said second synchronization sequence and including at least two repetitions of said first synchronization symbol.

26. The apparatus of claim 25, wherein said uplink transmitter is to synchronize between said uplink data frame and said downlink transmission based on a frequency offset corresponding to a frame of said downlink transmission.

27. The apparatus of claim 25, wherein at least one data symbol of said data frame includes a plurality of bits, wherein each of said bits is mapped to at least two frequency bins.

28. The apparatus of claim 25, wherein said uplink data frame includes a plurality of Discrete-Fourier-transform data symbols.

29. The apparatus of claim 25, wherein at least one symbol of said uplink data frame is an on-off-keying symbol, an M-ary Phase Shift Keying symbol, or an M-Order Quadrature Amplitude Modulation symbol.

* * * * *